(12) United States Patent
Ritter et al.

(10) Patent No.: US 7,662,033 B1
(45) Date of Patent: Feb. 16, 2010

(54) POULTRY BREAST SAW APPARATUS

(75) Inventors: Steven Ritter, Freeport, MN (US); Jerry Schmiesing, Melrose, MN (US)

(73) Assignee: Jennie-O Turkey Store, LLC, Willmar, MN (US)

( * ) Notice: Subject to any disclaimer, the term of this patent is extended or adjusted under 35 U.S.C. 154(b) by 495 days.

(21) Appl. No.: 11/610,679

(22) Filed: Dec. 14, 2006

(51) Int. Cl.
*A22C 18/00* (2006.01)
(52) U.S. Cl. ...................................... 452/160
(58) Field of Classification Search ................. 452/149, 452/152, 153, 155, 160–165, 169, 170; 83/423, 83/425.1, 425.3, 435.2
See application file for complete search history.

(56) References Cited

U.S. PATENT DOCUMENTS

| | | | |
|---|---|---|---|
| 4,503,586 A * | 3/1985 | Lockerby et al. ............... | 452/1 |
| 4,536,919 A * | 8/1985 | Cashwell et al. ............ | 452/160 |
| 4,562,613 A * | 1/1986 | Lewis .......................... | 452/160 |
| 4,564,976 A * | 1/1986 | Beech et al. ................. | 452/160 |
| 4,570,299 A * | 2/1986 | Ellis ............................ | 452/110 |
| 4,920,610 A * | 5/1990 | Callsen et al. ............... | 452/169 |
| 4,951,354 A * | 8/1990 | Callsen et al. ............... | 452/136 |
| 5,250,005 A * | 10/1993 | Matthiasson et al. ........ | 452/108 |
| 5,336,127 A * | 8/1994 | Hazenbroek ................. | 452/160 |
| 6,322,437 B1* | 11/2001 | Grabau et al. ............... | 452/161 |
| 7,341,505 B1* | 3/2008 | Gasbarro ..................... | 452/169 |

OTHER PUBLICATIONS

*USA Sales & Automation* brochure for "LBK H 2BV SP—Whole Bird Splitter", 4 pages (Dec. 2003).

* cited by examiner

*Primary Examiner*—Thomas Price
(74) *Attorney, Agent, or Firm*—IPLM Group, P.A.

(57) ABSTRACT

A breast saw apparatus (10) is used for cutting a poultry breast having a keel bone. A conveyor (30) moves the poultry breast through the apparatus (10). A bottom member (80) is supported above the conveyor (30). The bottom member (80) is configured for the poultry breast moving along the bottom member's length and supporting the poultry breast on its keel bone. An elongate top member (90) is positioned above the bottom member (30). A blade (70) is utilized to cut the poultry breast and the poultry breast is held straight between the top member (90) and the bottom member (80) as the poultry breast is moved by the conveyor (30) to the blade (70) for cutting.

8 Claims, 4 Drawing Sheets

US 7,662,033 B1

POULTRY BREAST SAW APPARATUS

BACKGROUND OF THE INVENTION

1. Field of the Invention

The present invention relates to a breast saw apparatus, and more particularly to a saw apparatus for cutting a poultry breast having a keel bone.

2. Description of the Prior Art

In processing poultry, especially turkeys, it is often advantageous to have a product that includes a breast that has been split in equal parts through the keel bone. This job is often done manually. In such an operation, a breast, with the back portion removed, is placed on a rod and manually pushed into a saw blade. There are two protruding fingers that contact the top of the breast as the operator manually pushes the breast toward the saw blade. Such a process is very time consuming and a difficult task for the operator.

There have been attempts to automate this process. One such example is a whole bird splitter by U.S.A. Sales Automation. However, such a unit has problems with holding the breast firmly so that a straight cut is made through the keel bone.

The present invention addresses the problems associated with the prior art's methods.

SUMMARY OF THE INVENTION

In one embodiment the invention is a breast saw apparatus for cutting a poultry breast having a keel bone. The breast saw apparatus includes a frame having an input end and an output end. A conveyor is positioned proximate to the frame for moving a poultry breast through the apparatus. A bottom member is supported above the conveyor.

The bottom member is configured for the poultry breast moving along the bottom member's length and supporting the poultry breast on its keel. An elongate top member has a first section proximate the input end and a second section proximate the output end. The top member has a length of at least 100% of the poultry's length. A blade is positioned at the second section's end, wherein the poultry breast is held straight between the top member and the bottom member as the poultry breast is moved by the conveyor to the blade for cutting.

In another embodiment the invention is a breast saw apparatus for cutting a poultry breast having a keel bone. The breast saw apparatus includes a frame having an input end and an output end. A conveyor is operatively connected to the frame for moving a poultry breast through the apparatus. The conveyor has a plurality of space members extending outward from the conveyor. A bottom member is supported above the conveyor. The bottom member is configured for the poultry breast moving along the bottom member's length and supporting the poultry breast on its keel bone. The bottom member has a slot. An elongate top member has a first section proximate the input end and a second section proximate the output end. The top member has a length of at least 100% of the poultry's length. The circular blade is positioned at the second section's end, wherein the poultry breast is held straight between the top member and the bottom member as the poultry breast is moved by the conveyor to the blade for cutting and the circular blade extends into the slot. The top member is angled relative to the bottom member. The top member is spaced further from the bottom member proximate the input end, wherein the poultry breast is compressed between the top member and the bottom member as the poultry breast is moved toward the blade.

In another embodiment, the invention is a breast saw apparatus for cutting a poultry breast having a keel bone. The breast saw apparatus includes a frame having an input end and an output end. A conveyor is operatively connected to the frame for moving a poultry breast through the apparatus. The conveyor has a plurality of space members extending outward from the conveyor. A bottom rod is operatively connected to the frame and supported above the conveyor. The bottom rod is configured for the poultry breast moving along the bottom rod's length and supporting the poultry breast on its keel bone. The bottom rod has a slot. An elongate top member has a first section proximate the input end and a second section proximate the output end. The top member has a length of at least 16 inches. The top member has a first elongate member spaced from the second elongate member, wherein the keel bone is positioned between the first and second elongate members and the keel bone extends above the first and second elongate members. A circular blade is positioned at the second section's end, wherein the poultry breast is held between the top member and the bottom member as the poultry breast is moved by the conveyor to the blade for cutting and the circular blade extends into the slot. The top member is angled relative to the bottom member. The top member is spaced further from the bottom member proximate the input end, wherein the poultry breast is compressed between the top member and the bottom member as the poultry breast is moved toward the blade. The bottom member is fixed, having no relative movement, and the top member is spring mounted, wherein the second section is moveable vertically as the poultry breast is moved toward the blade.

BRIEF DESCRIPTION OF THE DRAWINGS

FIG. 4 is a top plan view of a portion of the breast saw apparatus shown in

FIG. 1.

DETAILED DESCRIPTION OF A PREFERRED EMBODIMENT

Figure 1:
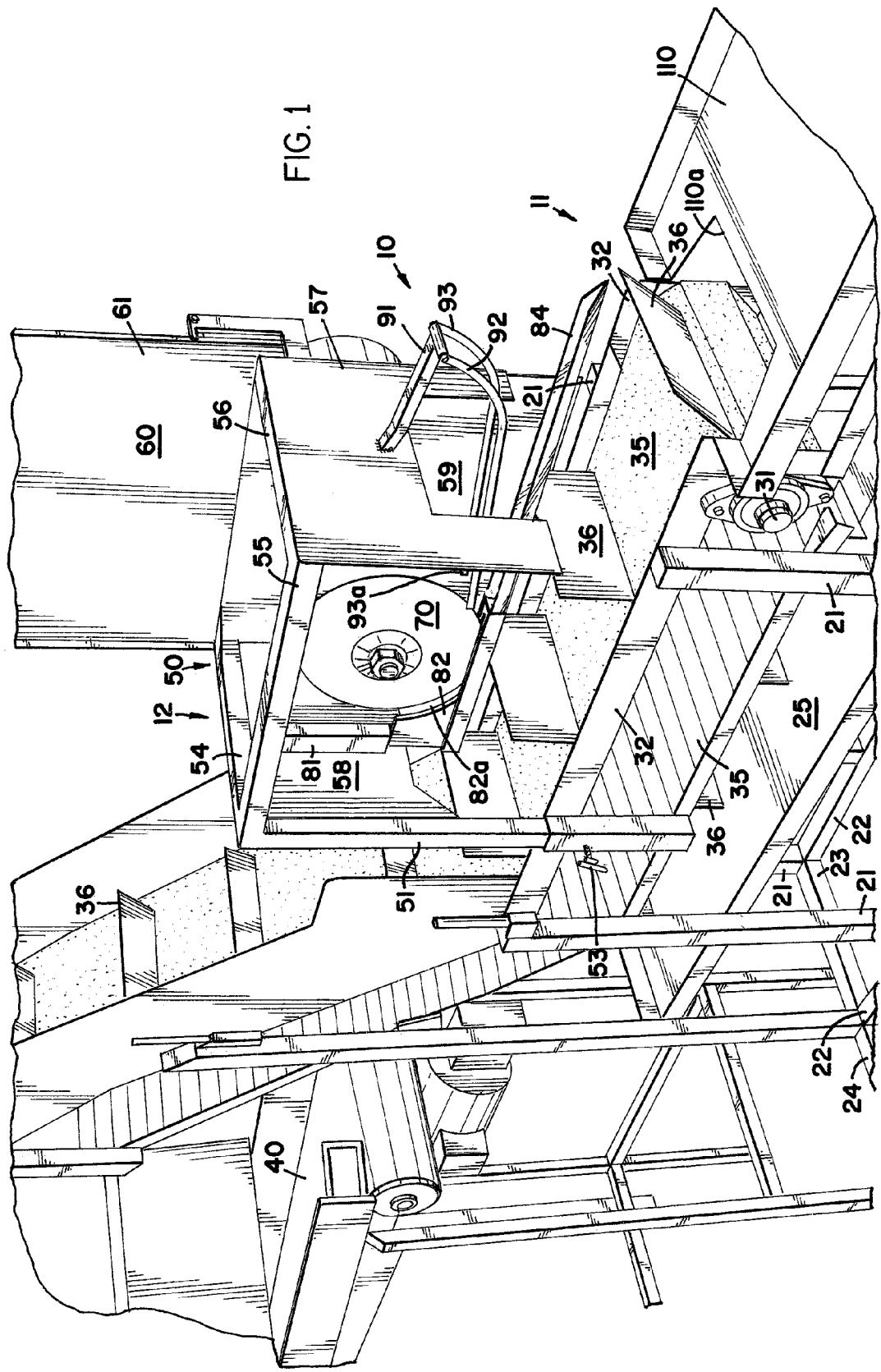
FIG. 1 is a perspective view of the breast saw apparatus constructed in accordance with the principles of the present invention.

Referring to the drawings, wherein like numerals represent like parts throughout the several views, there is generally disclosed at 10 a breast saw apparatus. The breast saw apparatus 10 includes a frame 20 that may be any suitable frame to support the breast saw apparatus 10. The frame 20 includes four upright posts 21, three of which are shown in FIG. 1, it being understood that the fourth one is hidden by the breast saw apparatus 10. The upright posts 21 are connected by two horizontal longitudinal members 22 and two horizontal cross-members 23, only one of which is shown in FIG. 1, it being understood that there is another cross-member 23 positioned at the other end of the frame 20. While only partially shown in FIG. 1, there is an outwardly extending member 24 that extends outward from the frame 20 and a suitable wheel may be operatively connected thereto. There would be three other similar members 24 at each of the corners of the frame 20, thereby making the frame 20 moveable. Although, it is understood that it is not necessary that the frame 20 be moveable, although it is preferred for ease of cleaning and maintenance. A drip pan 25 is positioned along the frame 20 and is operatively connected thereto by suitable means such as welding. The breast saw apparatus 10 generally has an input end 11 and an output end 12.

Figure 4:
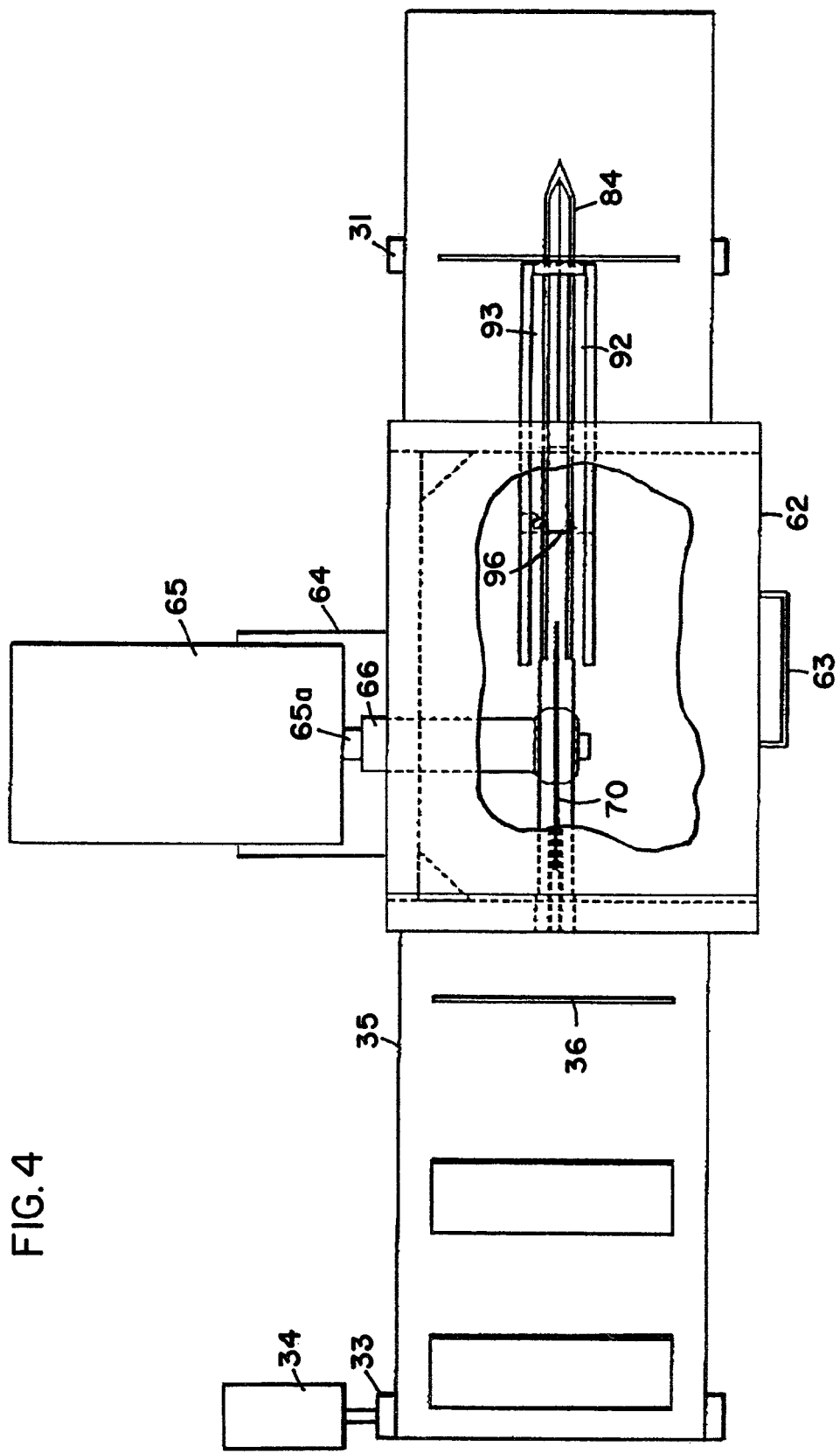

A conveyor 30 has a first end roller 31 operatively connected to the frame 21. As shown in FIG. 1, side members 32 are operatively connected between the posts 21 and the end roller 31 is operatively connected between the side members 32. A second end roller 33, as shown in FIG. 4, is supported by an extension of the frame 20 at a height, such that it is not visible in FIG. 1. While the conveyor 30 is shown being operatively connected to the frame 20, it is understood that a separate supporting structure may also be utilized for the conveyor 30. The second end roller 33 is driven by motor 34. The motor 34 drives a conveyor belt 35 that is positioned around the end rollers 31, 33. A plurality of paddle members 36 extend upward and outward from the belt 35 and are operatively connected to the belt 35. As will be described more fully hereafter, the paddle members 36 provide a motive force for moving the poultry through the breast saw apparatus 10. The conveyor 30 is shown in FIG. 1 is extending upward from the output end 12. It is understood that this is designed for a specific configuration of a plant in which the breast saw apparatus 10 is utilized. The conveyor 30 could be horizontal, depending upon the layout of the facilities in which the breast saw apparatus 10 is utilized. Another conveyor 40 is utilized in the processing of the poultry generally in the plant in which the breast saw apparatus 10 is utilized and is not necessary for the operation of the breast saw apparatus 10.

Figure 2:
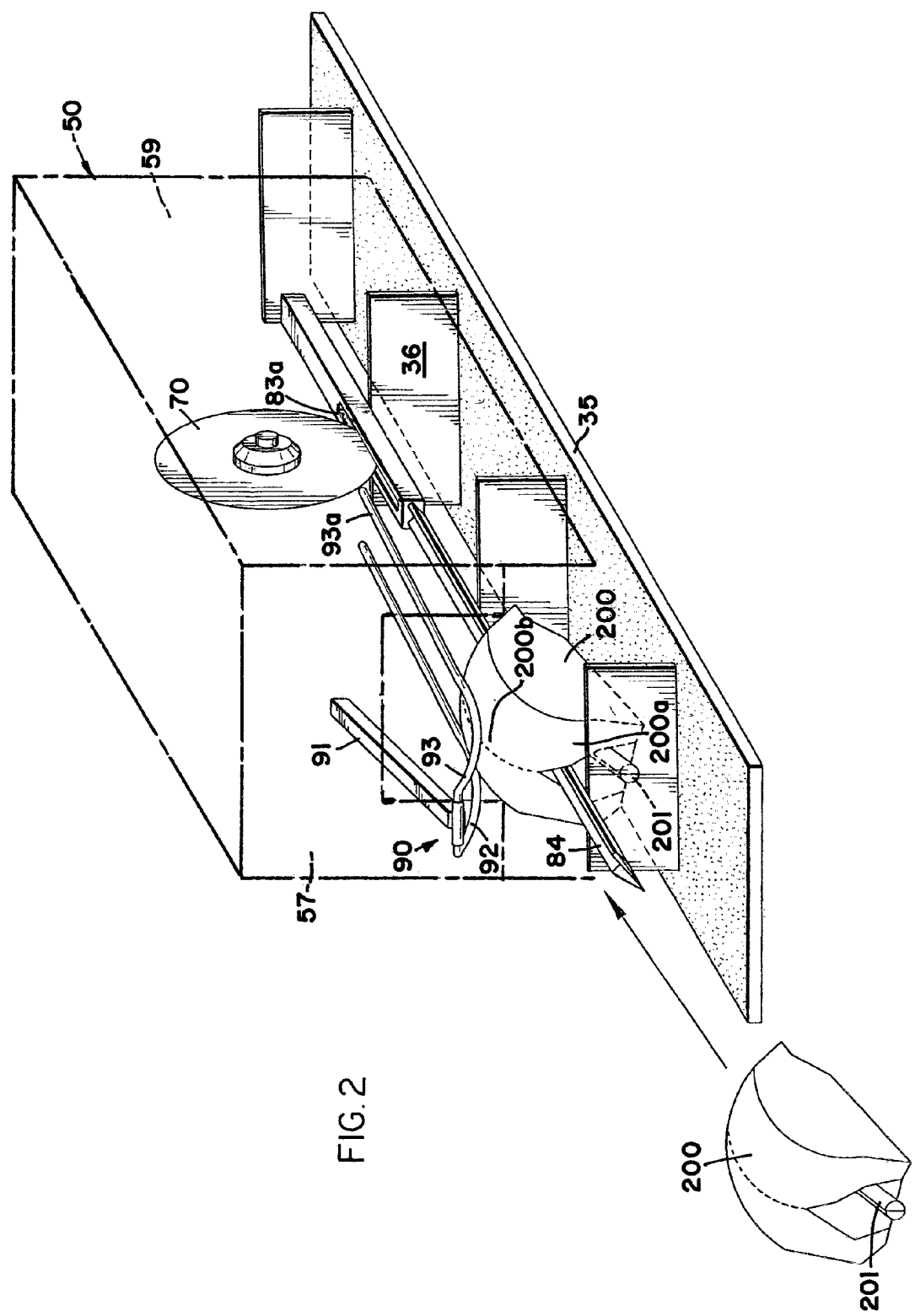
FIG. 2 is a schematic representation of the apparatus shown in FIG. 1, showing poultry being processed.
Figure 3:
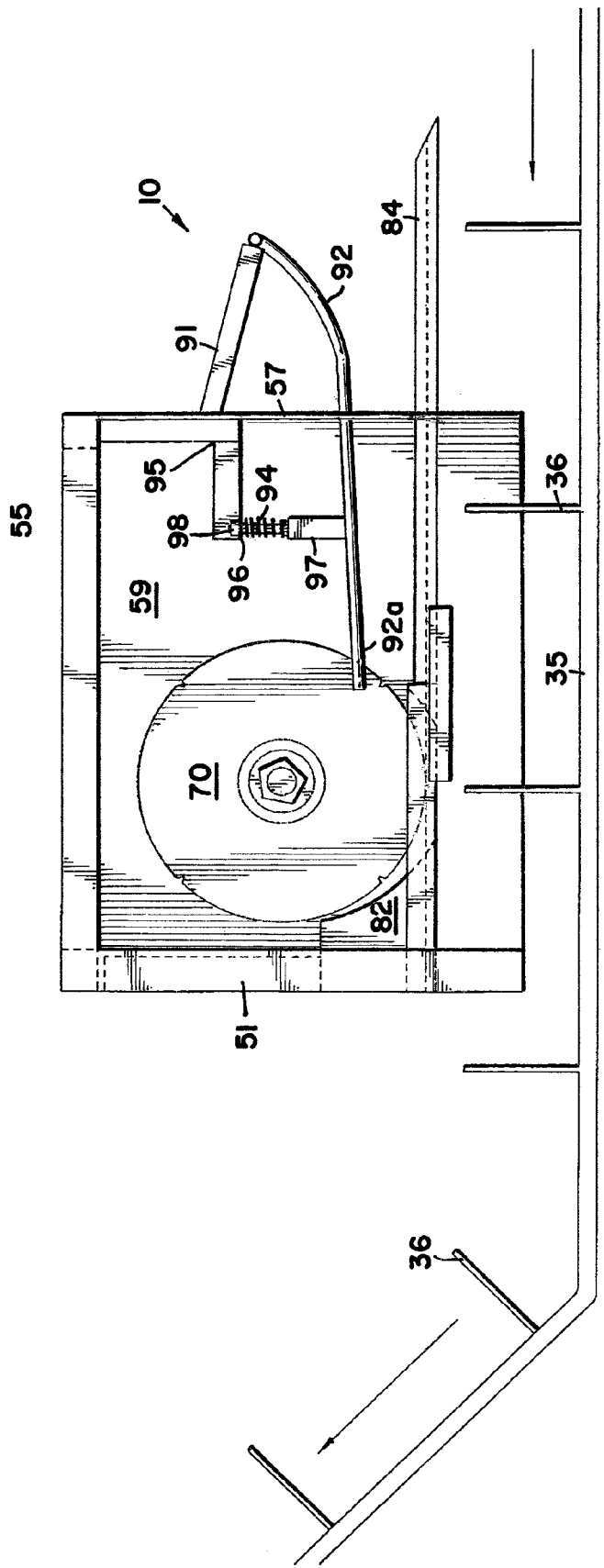
FIG. 3 is a side elevational view of a portion of the breast saw apparatus shown in FIG. 1.

A housing 50 is supported in a cantilevered manner by post 51 that is mounted in a rectangular sleeve 52 that is sized and configured to receive the post 51. The sleeve 52 is operatively connected to the frame 20 by suitable methods such as welding the sleeve 52 to the side member 32. A T-handle 53 has a shaft that extends through an opening in the sleeve 52 and goes through an aperture formed in the post 51, thereby securing the post 51 in position. It is understood that other means may also be utilized for securing the post 51 in the sleeve 52. The support structure of the housing 50 includes a cross-member 54 and a longitudinal member 55 that form a 90° angle and are operatively connected by suitable means, such as welding, to the post 51. An additional cross-member 56 is also suitably connected to the longitudinal member 55 at a 90° angle. The housing 50 is for enclosing the circular blade or saw 70, as will be described in more detail hereafter. The housing 50 includes an input panel 57, operatively connected to the cross-member 56. An output panel 58 is operatively connected to the cross-member 54 and post 51. A rear panel 59 is operatively connected to the ends of the cross-members 54 and 56. An L-shaped cover 60 is pivotally connected, proximate the rear panel 59 and provides for protection from the saw 70 on both the top and front. The L-shaped cover 60 includes a first panel 61 that forms the top of the housing 50 and a second panel 62 that forms the front of the housing 50. As shown in FIG. 1, the L-shaped cover 60 is in an "up" position, so as to see the inside of the housing 50. In FIG. 2, the housing 50 is shown in phantom. The second panel 62 has a handle 63 that may be grasped and moved upward to pivot the L-shaped cover 60 from an open to a closed position. A platform 64 is operatively connected to the rear panel 59 by suitable means such as welding, and extends outward and forms a base on which motor 65 is mounted. The motor 65 has an output shaft 65a which is in turn operatively connected to the arbor 66. The circular saw 70 is operatively connected to the arbor 66 and is thereby rotatably driven.

An elongate bottom member 80 is positioned to extend from proximate the circular saw 70 outward toward the input end. A bracket 81 is welded or otherwise suitably secured to the output panel 58 and cross-member 54. An extension member 82 is operatively connected, by suitable means such as welding, to the bracket 81. The extension member 82 has an arcuate surface 82a that is spaced approximately one inch from the edge of the circular saw 70. A horizontal component 83 extends underneath the circular saw 70. The horizontal component 83 has a groove 83a in which the periphery of the circular saw 70 may rotate, thereby bringing the edge of the saw 70 below the top surface of the horizontal component 83. An elongate horizontal V-shaped member 84 is operatively connected to the horizontal component 83 and extends outward toward the input end 11. The horizontal V-shaped member 84, as will be described more fully hereafter, provides support for the poultry, proximate the poultry's keel bone. The horizontal V-shaped member 84, as seen in FIG. 4, extends beyond the edge of the conveyor 30.

A top member 90 is positioned above the elongate member 80. The top member 90 includes an extension member 91 that is operatively connected to the input panel 57 by suitable means such as welding. As shown, the top member 90 includes two elongate members 92 and 93 that are operatively connected to the extension member 91 by suitable means such as welding. The elongate members 92 and 93 are spaced apart from each other and also, have a generally downward slant. That is, toward the input end the distance from elongate members 92, 93 to the horizontal V-shaped member 84 is greater than the distance from the elongate members 92 and 93 to the horizontal V-shaped member 84 as it approaches the circular blade 70. Further, the elongate members 92 and 93 are spring mounted. The connection between the extension member 91 and the elongate members 92 and 93 is fixed. However, the ends 92a and 93a are able to move vertically due to the mounting that provides a spring-like mounting. An L-shaped bracket 95 is welded to the inside of the input panel 57. A bar member 96 is then operatively connected, by suitable means such as welding, perpendicular to the bottom of the L-shaped bracket 95. Each of the members 92 and 93 are mounted in the same manner, and accordingly only the mounting of elongate member 92 will be described in more detail. A rod 94 is positioned in a bore in block 97, which is in turn welded or otherwise secured to the elongate member 92. A nut 98 is used to secure the first end of the rod 94 to the bar member 96. Therefore, the natural spring of the rods 92 and 93, that are fixed only at one end, allow the ends 92a and 93a to move upward. However, it is understood that this is a limited movement as the rods members 92 and 93 are typically made of stainless steel.

An input table 110 is positioned proximate the input end 11. The table 110 has a rectangular cutout 110a that allows for the paddle members 36 to move through the table 110.

In operation, a plurality of poultry, such as turkeys 200 or other poultry are placed on the input table 110. The turkeys 200 have had their hind saddle (legs and lower half of the back) removed. Also, the wings are deboned and their meat typically stays with the front portion. The neck of the turkey is represented by numeral 201 in FIG. 2. Then, an operator places the poultry on the bottom member 80 with the bottom member 80 extending through the carcass. The turkey 200 rests on the bottom member 80. Then, as the conveyor 30 is turning, a paddle 36 will engage the turkey 200 proximate its front 200a and move the turkey 200 from the input end toward the circular blade 70. The top portion 200b is positioned so as to contact the top member 90. As shown, the highest point of the top of the turkey 200 will extend between the elongate members 92 and 93 slightly. As the turkey 200 is moved toward the saw, a downward force is exerted by the downward slant of the elongate members 92 and 93 to hold the turkey 200 in position as it is moved toward the circular saw 70. The circular saw 70 will then cut along the keel bone, shown in dashed line on the turkey 200 in FIG. 2, and split the turkey 200 in half. The conveyor 30 will then continue to move the split turkey 200 away from the saw blade 70. The elongate members 92 and 93 preferably are at least 16 inches in length. Another measure of the top member 90 would be that the elongate rod members 92 and 93 of the top member 90 are at least the same length as the poultry being cut. The length of the poultry is the length from the neck to the bottom of the breast. The length of the top member 90 refers to the length of the top member 90 (that is the elongate members 92 and 93) that come in contact and guide the turkey 200 as it is being moved toward the circular saw 70. This provides for a stabilizing force and allows for the turkey 200 to be cut evenly along its keel bone.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A breast saw apparatus for cutting a poultry breast having a keel bone, the breast saw apparatus comprising:
   a) a frame having an input end and an output end;
   b) a conveyor operatively connected to the frame for moving a poultry breast through the apparatus, the conveyor having a plurality of spaced members extending outward from the conveyor;
   c) a bottom member supported above the conveyor, the bottom member configured for the poultry breast moving along the bottom member's length and supporting the poultry breast on its keel bone, the bottom member having a slot;
   d) an elongate top member having a first section proximate the input end and a second section, having an end, proximate the output end, the top member having a length of at least 100% of the poultry's length;
   e) a circular blade positioned at the second section's end, wherein the poultry breast is held straight between the top member and the bottom member as the poultry breast is moved by the conveyor to the blade for cutting and the circular blade extends into the slot; and
   f) the top member is angled relative to the bottom member, the top member spaced further from the bottom member proximate the input end, wherein the poultry breast is compressed between the top member and the bottom member as the poultry breast is moved toward the blade.

2. The breast saw of claim 1, the spaced members extending outward from the conveyor.

3. The breast saw of claim 1, further comprising the bottom member being a bottom rod.

4. The breast saw of claim 1, further comprising the bottom member is fixed, having no relative movement and the top member is spring mounted, wherein the second section is moveable vertically as the poultry breast is moved toward the blade.

5. The breast saw of claim 1, the bottom member having a first elongate member spaced from a second elongate member, wherein the keel bone is positioned between the first and second elongate members and the keel bone extends above the first and second elongate members.

6. The breast saw of claim 5, further comprising the first elongate member is a first rod and the second elongate member is a second rod.

7. The breast saw of claim 1, wherein the length of the top member is at least 16 inches.

8. A breast saw apparatus for cutting a poultry breast having a keel bone, the breast saw apparatus comprising:
   a) a frame having an input end and an output end;
   b) a conveyor operatively connected to the frame for moving a poultry breast through the apparatus, the conveyor having a plurality of spaced members extending outward from the conveyor;
   c) a bottom rod operatively connected to the frame and supported above the conveyor, the bottom rod configured for the poultry breast moving along the bottom rod's length and supporting the poultry breast on its keel bone, the bottom rod having a slot;
   d) an elongate top member operatively connected to the frame, having a first section proximate the input end and a second section, having an end, proximate the output end, the top member having a length of at least 16 inches, the top member having a first elongate member spaced from a second elongate member, wherein the keel bone is positioned between the first and second elongate members and the keel bone extends above the first and second elongate members;
   e) a circular blade positioned at the second section's end, wherein the poultry breast is held straight between the top member and the bottom member as the poultry breast is moved by the conveyor to the blade for cutting and the circular blade extends into the slot;
   f) the top member is angled relative to the bottom member, the top member spaced further from the bottom member proximate the input end, wherein the poultry breast is compressed between the top member and the bottom member as the poultry breast is moved toward the blade; and
   g) the bottom member is fixed, having no relative movement and the top member is spring mounted, wherein the second section is moveable vertically as the poultry breast is moved toward the blade.

* * * * *

UNITED STATES PATENT AND TRADEMARK OFFICE
CERTIFICATE OF CORRECTION

PATENT NO. : 7,662,033 B1
APPLICATION NO. : 11/610679
DATED : February 16, 2010
INVENTOR(S) : Ritter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 559 days.

Signed and Sealed this

Thirtieth Day of November, 2010

David J. Kappos
*Director of the United States Patent and Trademark Office*